US008796885B2

(12) United States Patent
Tan et al.

(10) Patent No.: US 8,796,885 B2
(45) Date of Patent: Aug. 5, 2014

(54) COMBINING POWER FROM MULTIPLE RESONANCE MAGNETIC RECEIVERS IN RESONANCE MAGNETIC POWER SYSTEM

(75) Inventors: Li-Quan Tan, Sunnyvale, CA (US); David T. Amm, Morgan Hill, CA (US)

(73) Assignee: Apple Inc., Cupertino, CA (US)

( * ) Notice: Subject to any disclaimer, the term of this patent is extended or adjusted under 35 U.S.C. 154(b) by 205 days.

(21) Appl. No.: 13/452,712

(22) Filed: Apr. 20, 2012

(65) Prior Publication Data

US 2012/0306282 A1  Dec. 6, 2012

Related U.S. Application Data

(60) Provisional application No. 61/491,844, filed on May 31, 2011.

(51) Int. Cl.
*H01F 27/42* (2006.01)
*H04B 5/00* (2006.01)

(52) U.S. Cl.
CPC .................................. *H04B 5/0037* (2013.01)
USPC ........................................................ 307/104

(58) Field of Classification Search
CPC ............................... H04B 5/0037; H02J 7/025
USPC ........................................................ 307/104
See application file for complete search history.

(56) References Cited

U.S. PATENT DOCUMENTS

| 5,701,121 | A  | 12/1997 | Murdoch |
| 6,028,413 | A  | 2/2000  | Brockmann |
| 6,633,155 | B1 | 10/2003 | Liang |
| 6,844,702 | B2 | 1/2005  | Giannopoulos et al. |
| 6,970,142 | B1 | 11/2005 | Pleva et al. |
| 7,570,220 | B2 | 8/2009  | Hall et al. |
| 7,741,734 | B2 | 6/2010  | Joannopoulos et al. |
| 7,825,543 | B2 | 11/2010 | Karalis et al. |
| 8,198,754 | B2 | 6/2012  | Iisaka et al. |
| 8,332,547 | B2 | 12/2012 | Sugaya |
| 8,400,017 | B2 | 3/2013  | Kurs et al. |
| 8,463,332 | B2 | 6/2013  | Sato et al. |
| 8,598,747 | B2 | 12/2013 | Bilbrey et al. |

(Continued)

FOREIGN PATENT DOCUMENTS

| CN | 1829037 | 9/2006 |
| CN | 2919568 | 7/2007 |

(Continued)

OTHER PUBLICATIONS

PCT Application No. PCT/US2011/038640—International Search Report dated Jan. 2, 2012.

(Continued)

*Primary Examiner* — Daniel Cavallari
(74) *Attorney, Agent, or Firm* — Womble Carlyle Sandridge & Rice LLP

(57) ABSTRACT

Various embodiments of a wirelessly powered local computing environment are described. A system and method for utilizing wireless near field magnetic resonance (NFMR) power transmission in a computing environment. A small form factor wireless power unit can be used to replace conventional batteries.

25 Claims, 18 Drawing Sheets

(56) References Cited

U.S. PATENT DOCUMENTS

| | | |
|---|---|---|
| 2003/0214821 A1 | 11/2003 | Giannopoulos et al. |
| 2005/0134213 A1 | 6/2005 | Takagi et al. |
| 2007/0298846 A1 | 12/2007 | Greene et al. |
| 2008/0058029 A1 | 3/2008 | Sato et al. |
| 2008/0079396 A1 | 4/2008 | Yamazaki et al. |
| 2009/0058189 A1 | 3/2009 | Cook et al. |
| 2009/0058361 A1 | 3/2009 | John |
| 2009/0133942 A1 | 5/2009 | Iisaka et al. |
| 2009/0134712 A1 | 5/2009 | Cook et al. |
| 2009/0243394 A1 | 10/2009 | Levine |
| 2009/0243397 A1 | 10/2009 | Cook et al. |
| 2009/0251008 A1 | 10/2009 | Sugaya |
| 2009/0271048 A1 | 10/2009 | Wakamatsu |
| 2009/0284220 A1 | 11/2009 | Toncich et al. |
| 2009/0286470 A1 | 11/2009 | Mohammadian et al. |
| 2009/0289595 A1 | 11/2009 | Chen et al. |
| 2010/0007307 A1 | 1/2010 | Baarman et al. |
| 2010/0036773 A1 | 2/2010 | Bennett |
| 2010/0052431 A1 | 3/2010 | Mita |
| 2010/0148723 A1 | 6/2010 | Cook et al. |
| 2010/0171368 A1 | 7/2010 | Schatz et al. |
| 2010/0181961 A1 | 7/2010 | Novak et al. |
| 2010/0184371 A1 | 7/2010 | Cook et al. |
| 2010/0187913 A1 | 7/2010 | Smith et al. |
| 2010/0194334 A1 | 8/2010 | Kirby et al. |
| 2010/0222010 A1 | 9/2010 | Ozaki et al. |
| 2010/0244583 A1 | 9/2010 | Shimokawa |
| 2010/0279606 A1 | 11/2010 | Hillan et al. |
| 2010/0323616 A1 | 12/2010 | Von Novak et al. |
| 2011/0018679 A1 | 1/2011 | Davis et al. |
| 2012/0153732 A1 | 6/2012 | Kurs et al. |
| 2012/0169136 A1* | 7/2012 | Lisi et al. ............... 307/104 |
| 2012/0187767 A1* | 7/2012 | Kanno et al. ............. 307/82 |
| 2012/0206097 A1* | 8/2012 | Soar ....................... 320/108 |
| 2012/0217818 A1* | 8/2012 | Yerazunis et al. ........ 307/104 |
| 2012/0262002 A1* | 10/2012 | Widmer et al. ........... 307/104 |

FOREIGN PATENT DOCUMENTS

| | | |
|---|---|---|
| EP | 0786835 | 7/1997 |
| EP | 0903830 | 3/1999 |
| EP | 2075667 | 7/2009 |
| EP | 2033312 | 2/2011 |
| JP | 2005151609 | 6/2005 |
| JP | 2005210843 | 8/2005 |
| JP | 2006314181 | 11/2006 |
| JP | 2009131039 | 6/2009 |
| JP | 2009251895 | 10/2009 |
| JP | 2009268311 | 11/2009 |
| WO | WO2007089680 | 8/2007 |
| WO | WO2007146164 | 12/2007 |
| WO | WO2008109489 | 9/2008 |
| WO | WO2009039113 | 3/2009 |
| WO | WO2009039115 | 3/2009 |
| WO | WO2009111597 | 9/2009 |
| WO | WO2009122355 | 10/2009 |
| WO | WO2009131990 | 10/2009 |
| WO | WO2010047850 | 4/2010 |
| WO | WO2010/093967 | 8/2010 |
| WO | WO2010129369 | 11/2010 |
| WO | WO2011028956 | 3/2011 |

OTHER PUBLICATIONS

PCT Application No. PCT/US2011/038640—Written Opinion dated Jan. 2, 2012.

International Search Report dated Jan. 2, 2012 for PCT/US2011/038640.

Written Opinion dated Jan. 2, 2012 for PCT/US2011/038640.

Japanese Patent Application No. 2012-538950—Office Action dated Aug. 12, 2013, 8 pages.

Taiwanese Patent Application No. 099139193—Office Action dated Aug. 26, 2013, 16 pages.

Korean Patent Application No. 10-2012-7015364—Office Action dated Sep. 11, 2013, 10 pages.

PCT Application No. PCT/US2010/056240—International Search Report dated May 24, 2011.

PCT Application No. PCT/US2010/056240—Written Opinion dated May 24, 2011.

PCT Application No. PCT/US20111038635—International Search Report dated Jan. 2, 2012.

PCT Application No. PCT/US20111038635—Written Opinion dated Jan. 2, 2012.

Karalis, et al., "Efficient wireless non-radiative mid-range energy transfer." Annals of Physics, 323, pp. 34-48 (2008).

PCT Application No. PCT/US2011/061384—International Search Report dated Feb. 14, 2013.

PCT Application No. PCT/US2011/061384—Written Opinion dated Feb. 14, 2013.

Disclosed Anonymously, "Wireless Conductive AC/DC Power for Laptops and Other Devices", IP.com No. IPCOM000197537D, published Jul. 13, 2010 (5 pages).

PCT Application No. PCT/US2011/038641—International Search Report & Written Opinion dated Jan. 2, 2012.

PCT Application No. PCT/US2011/038633—International Search Report & Written Opinion dated Jan. 2, 2012.

Yuan, Q. et al. "Numerical Analysis on Transmission Efficiency of Evanescent Resonant Coupling Wireless Power Transfer System", IEEE Transactions on Antennas and Propagation, vol. 58, No. 5, May 2010, pp. 1751-1758.

Cannon, B.L. et al. "Magnetic Resonant Coupling As a Potential Means for Wireless Power Transfer to Multiple Small Receivers", IEEE Transactions on Power Electronics, vol. 24, No. 7, Jul. 2009, pp. 1819-1825.

IBM, "Method for Prioritizing Distribution Of Wireless Electricity to Multiple Users Using a Single Power Source", IP.com No. IPCOM000188525D, published Oct. 12, 2009, pp. 1-2.

Chinese Application for Invention No. 201110462933.9—Office Action dated Dec. 20, 2013.

Chinese Application for Invention No. 201080051931.4—Office Action dated Jan. 23, 2014.

Korean Patent Application No. 10-2013-7032979—Notice of Preliminary Rejection Feb. 21, 2014.

Taiwanese Patent Application No. 099139193—Office Action dated Feb. 12, 2014.

* cited by examiner

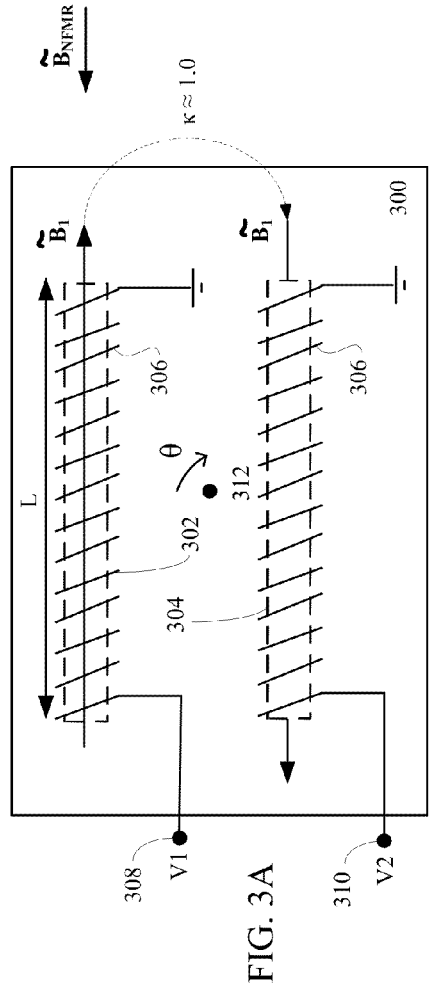
FIG. 3A
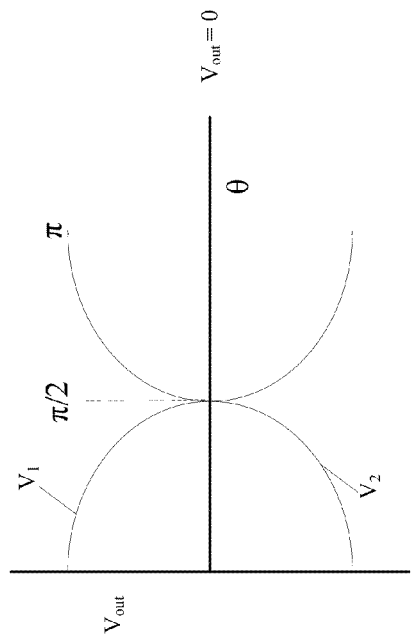
FIG. 3B
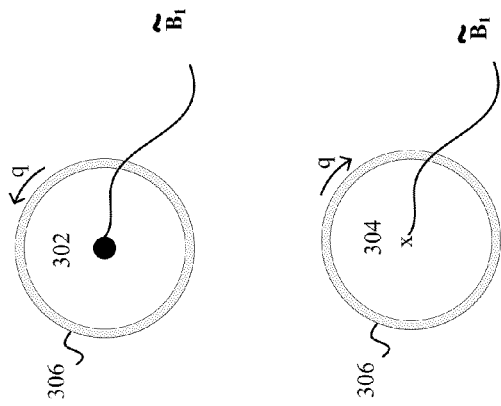

COMBINING POWER FROM MULTIPLE RESONANCE MAGNETIC RECEIVERS IN RESONANCE MAGNETIC POWER SYSTEM

CROSS REFERENCE TO RELATED APPLICATIONS

This application claims priority to and the benefit under 35 U.S.C. §119(e) of U.S. Provisional Application Ser. No. 61/491,844, filed May 31, 2011, entitled MAGNETICALLY DE-COUPLED MULTIPLE RESONATING COILS IN A TIGHTLY SPACED ARRAY, the entire disclosure of which is incorporated herein by reference.

TECHNICAL FIELD

The described embodiments relate generally to utilizing a wireless power transmission in a portable computing environment.

BACKGROUND

As described in Annals of Physics 323 (2008) 34-48 "Efficient Wireless Non-Radiative Mid-range Energy Transfer" by Aristeidis Karalis et al., available online Apr. 27, 2007, that is incorporated by reference in its entirety for all purposes, useable power can be transferred wirelessly from a power source to a receiver located within a distance referred to as a near field.

What is desired are methods, systems, and apparatus for efficient and user friendly interaction between peripheral devices in a wirelessly powered local computing environment.

SUMMARY

The present invention provides a system and method for utilizing wireless near field magnetic resonance (NFMR) power transmission in a computing environment. In particular, methods, systems, and apparatus that describe a peripheral device arranged to wirelessly receive power from an NFMR power transmitter in useable amounts while positioned in about any spatial orientation with respect to the NFMF transmitter.

A wireless power unit arranged to provide at least a minimum amount of power to a device wirelessly received from a magnetic field provided by a near field magnetic resonance (NFMR) transmitter unit having a resonance frequency $\omega_T$, the minimum amount of power delivered to the device being independent of a spatial orientation of the portable power unit with respect to the magnetic field is described. The wireless power unit includes a first resonator structure, the first resonator structure having a resonant frequency $\omega_1$, and a characteristic size $L_1$, a second resonator structure, the second resonator structure having a resonant frequency $\omega_2$, and a characteristic size $L_2$, wherein the first and second resonator structures are magnetically decoupled such that an effective magnetic coupling coefficient κeff between the first and second resonator structures is about zero, and a power combining circuit coupled to the magnetically decoupled first and second resonator structures arranged to: load match the first and second resonator structures and the device, load balance power from the first and second resonator structures, and maintain an effective magnetic coupling coefficient between the first and second resonator structures at about zero regardless of a spatial orientation of the wireless power unit with regards to the NFMR magnetic field such that the device wirelessly receives the at least the minimum amount of power from the wireless power unit regardless of an orientation of the at least two NFMR power receivers with respect to the NFMR magnetic field.

A peripheral device arranged to wirelessly receive power from a NFMR power transmitter independent of the orientation of the peripheral device with respect to the NFMR power transmitter is described. The peripheral device includes at least a wireless power receiving unit. The wireless power receiving unit includes at least two magnetically de-coupled near field magnetic resonance (NFMR) power receivers each arranged to receive power from a NFMR magnetic field, a power combining circuit coupled to the at least two magnetically decoupled NFMR power receivers arranged to: load match the at least two NFMR power receivers and the device, load balance power from the at least two NFMR power receivers, and maintain an effective magnetic coupling coefficient between the at least two magnetically de-coupled NFMR power receivers at about zero regardless of a spatial orientation of the wireless power unit with regards to the NFMR magnetic field such that the device wirelessly receives the substantial constant power from the wireless power unit regardless of an orientation of the at least two NFMR power receivers with respect to the NFMR magnetic field.

Other apparatuses, methods, features and advantages of the described embodiments will be or will become apparent to one with skill in the art upon examination of the following figures and detailed description. It is target that all such additional apparatuses, methods, features and advantages be included within this description be within the scope of and protected by the accompanying claims.

BRIEF DESCRIPTION OF THE DRAWINGS

The included drawings are for illustrative purposes and serve only to provide examples of possible structures and arrangements for the disclosed embodiments. These drawings in no way limit any changes in form and detail that may be made to the described embodiments by one skilled in the art without departing from the spirit and scope of the embodiments.

FIGS. 3A-3B shows power supply unit having an output voltage that is dependent on spatial orientation.

DETAILED DESCRIPTION

Figure 1A:
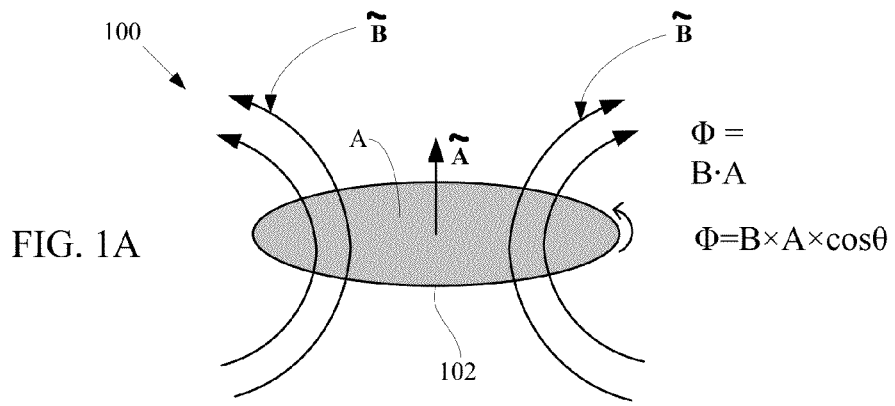
FIGS. 1A-1C illustrate a relationship between magnetic flux and spatial orientation of a closed loop.

Various embodiments of a wirelessly powered local computing environment are described. The wireless powered local computing environment includes at least a near field magnetic resonance (NFMR) power supply arranged to wirelessly provide power to any of a number of suitably configured devices. In the described embodiments, the devices arranged to receive power wirelessly from the NFMR power supply can be located in a region known as the near field that extends about a distance D that can be a few times a characteristic size of the NFMR power supply transmission device. Typically, the distance D can be on the order of 1 meter or so.

In the context of this discussion, it is well known that useable power can be wirelessly transmitted by way of a wireless transmitter and receiver transiently coupled by way of a magnetic field. More specifically, a system in accordance with the described embodiments can include a wireless power receiver incorporated within or electrically coupled to a peripheral device that can wirelessly receive useful amounts of power from an external power supply. In the described system, the wireless power receiver can include a first resonator structure having a first resonant frequency $\omega_1$, a first Q factor $Q_1$ (a measure of power transfer efficiency), and a first characteristic size $L_1$. For example, in the context of a computing system where the peripheral device takes the form of a computer mouse or other input device, the characteristic size $L_1$ can be on the order of a few inches or centimeters. The system can also include a power supply coupled to at least a second resonator structure positioned a variable distance d from the first resonator structure having a second resonant frequency $\omega_2$ and a second Q factor $Q_2$ and second characteristic size $L_2$. For example, the second resonator structure can be incorporated within a computer such as a desktop or laptop computer. In this way, a charging region can be formed around the computer in which the peripheral device (or any other appropriately configured device) can wirelessly receive useful amounts of power from the power supply via the second resonator structure.

When first and second resonant frequencies $\omega_1$ and $\omega_2$ are close together, a coupling region between the first and second resonator structures can be formed. Within this coupling region, useful power can be transferred by way of a non-radiative energy transfer mechanism that utilizes resonant-field evanescent tails of the magnetic field provided by the second resonator structure. For example, when the first resonator structure is incorporated into a peripheral device such as a computer mouse, the computer mouse can be at least partially supplied with power from the second resonator structure coupled to the power supply. In this way, the peripheral device can operate in a wireless mode without the need for a separate power supply other than that provided in the computing device. The amount and duration of power that can be delivered to the peripheral device can be strongly dependent on a number of factors. For example, the coupling between the first resonator structure and the second resonator structure can be dependent upon a spatial orientation of the second resonator structure and a magnetic field generated by the first resonant magnetic structure as well as by variable distance d.

In order to avoid or at least reduce the spatial orientation dependence, the peripheral device in the described embodiments can include a power receiving unit that incorporates a plurality of individual resonators having different spatial orientations with respect to each other. In this way, power wirelessly received at the power receiving unit can be essentially independent from any movement of the peripheral device with respect to the magnetic field generated by the second resonator structure (hereinafter referred to as the NFMR magnetic field). However, each of the individual resonators can themselves create a magnetic field in response to the NFMR magnetic field that, in turn, can couple with others of the individual resonators. The coupling between the individual resonators in the power receiving unit can be characterized by coupling coefficient $\kappa$ that can range from zero (0) in those cases where there is little or no magnetic coupling to about one (1) when there is strong magnetic coupling. In those arrangements where the individual resonators are strongly coupled, each resonator can have a substantial effect on other resonators thereby affecting the performance of the power receiving unit as a whole. Therefore it would be advantageous for those power receiving units having more than one individual resonator that coupling coefficient $\kappa$ between the more than one resonators be as close to zero as practicable. This is particularly true for peripheral devices that can be moved about within the charging region where the relative orientation between the resonator structures and the NFMR magnetic field used to transfer energy from the power supply can vary greatly.

Accordingly, in one embodiment a wirelessly powered local computing environment is described. The wirelessly powered local computing environment can include a NFMR wireless power supply arranged to use a resonance channel to transfer useable energy to resonance circuits within near field distance D. (that defines an outermost wireless range of a magnetic field transmitted by an NFMR power supply transmitter) and a central processing unit that provides processing resources to the NFMR power supply. Also included in the local computing environment is a peripheral device that can freely move about within the local computing environment arranged to wirelessly receive power from the NFMR power transmitter. The peripheral device can include at least a power receiving unit having a least two magnetically de-coupled NFMR power receivers in the form of individual resonators that are electrically coupled to each other to provide output voltage $V_{out}$. Since magnetic coupling coefficient $\kappa$ between the receiver resonators is about zero, output voltage $V_{out}$ is substantially independent of the spatial orientation of the peripheral device with respect to the NFMR magnetic field. In this way, the peripheral device can wirelessly receive a usable amount of power from the NFMR power supply regardless of its orientation. In another embodiment, a peripheral device arranged to wirelessly receive power from a NFMR power transmitter is described. The peripheral device includes at least a power receiving unit having a least two magnetically de-coupled NFMR power receivers. In other words, a coupling coefficient between the at least two magnetically de-coupled NFMR power receivers is about zero regardless of the spatial orientation of the power receiving unit with regards to a magnetic field generated by the NFMR power transmitter. In this way, power is received from the NFMR power transmitter at the peripheral device in usable amounts regardless of the relative orientation of the magnetic field generated by the NFMR power transmitter and the peripheral device.

In one embodiment the peripheral device is a user input device such as a computer mouse and the NFMR power transmitter is incorporated into a computing system in communication with the computer mouse. Furthermore, the magnetically de-coupled NFMR power receivers in the power receiving unit have a shape and size consistent with a conventional battery unit each having longitudinal axes that in some cases overlap each other at about ninety degrees while in other cases are orthogonal to each other but do not overlap.

In another embodiment, a small form factor wireless power unit arranged to provide useable power. The small form factor wireless power unit includes at least a resonance power coil arranged to receive power from a near field magnetic resonance (NFMR) transmitter coupled to a power supply by way of a power transfer channel when the resonance power coil is configured to operate at a resonance frequency of the NFMR transmitter, wherein the small form factor wireless power unit is sized to fit within a battery compartment of a peripheral device.

In one aspect of the described embodiment, the peripheral unit includes at least three NFMR power receiver units around perpendicular to each other. In this way, the peripheral device can be moved in any three dimensional spatial volume without a substantial loss in power wirelessly received from an NFMR power transmitter.

These and other embodiments are discussed below with reference to FIGS. 1-13. However, those skilled in the art will readily appreciate that the detailed description given herein with respect to these figures is for explanatory purposes only and should not be construed as limiting.

The magnetic coupling between individual resonators in the power receiving unit can be described using Faraday's Law of Induction or more simply Faraday's Law that defines electromotive force (EMF) or voltage as the amount of work done moving unit charge q around the closed curve as shown in FIG. 1A as system 100. According to Faraday's Law, the EMF produced around closed loop path 102 is proportional to time rate of change ($d\Phi/dt$) of magnetic flux $\Phi$ bounded by closed loop path 102 and associated with surface A with normal vector A. In this way, electric current can be induced in any closed circuit when the magnetic flux $\Phi_B$ through surface A changes. The relationship between electromotive force (or voltage) and the change in magnetic flux can satisfy the differential form of Faraday's Law in the form of Eq. (1):

Eq. (1)

where $\epsilon$ is electromotive force, or voltage, developed by a change in magnetic flux $\Phi_B$ enclosed within area A of a single one of N conductive closed loops each having the same cross sectional area.

Magnetic flux $\Phi_B$ is a scalar that is related to $$\varepsilon = -N\frac{d\Phi_B}{dt}$$

magnetic field vector B and normal vector A corresponding to surface A defined by closed loop path 102 according to Eq. (2):

$$\Phi_B = B \cdot A \qquad \text{Eq. (2)}$$

where:
B is magnetic field vector,
A is normal vector of surface A enclosed by closed loop 102; and
B·A is the dot product vectors B and A, or in scalar form, AB $\cos(\theta)$.

Figure 1B:
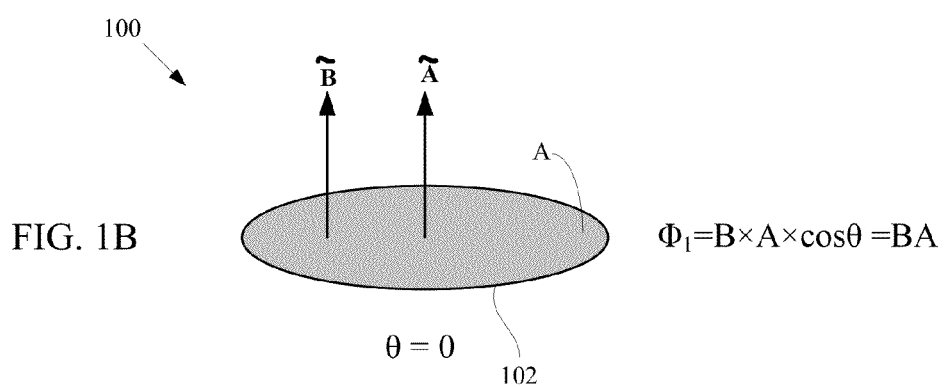
Figure 1C:
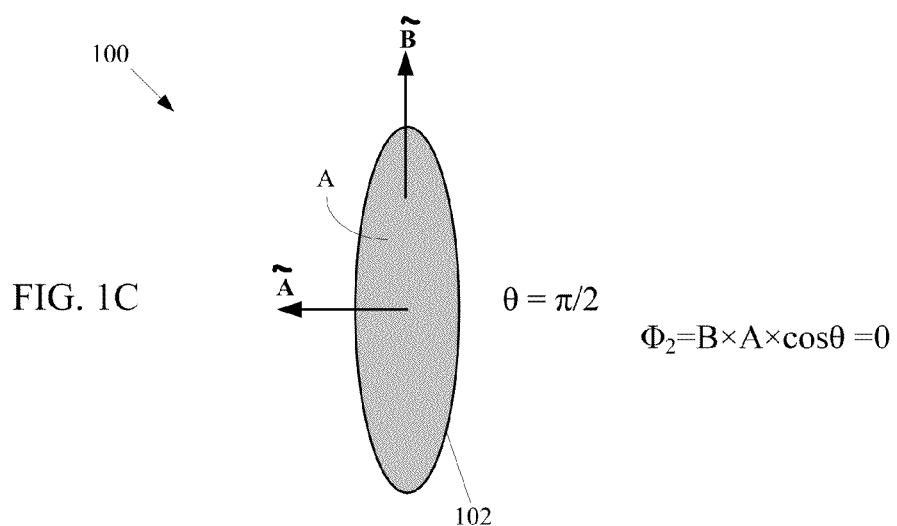
Figure 2:
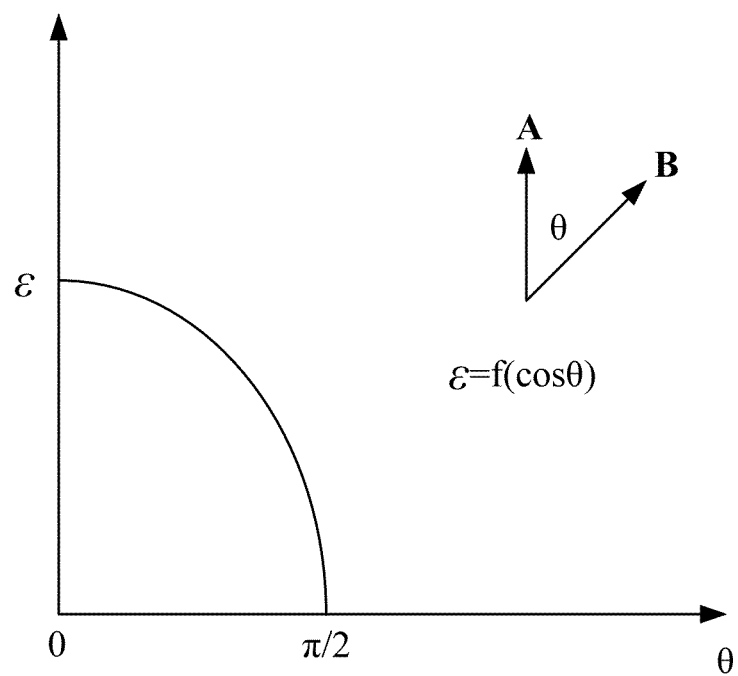
FIG. 2 graphically illustrates a relationship between induced voltage, or EMF, and spatial orientation angle θ.

Therefore, magnetic flux $\Phi_B$ varies as the cosine of orientation angle $\theta$ where orientation angle $\theta$ represents the spatial orientation of magnetic field vector B and normal vector A shown in FIGS. 1B and 1C. According to Eq. (2) and shown in FIG. 1B, when magnetic field vector B and normal vector A align with each other (i.e., angle $\theta$ is zero and therefore $\cos(\theta)$ is 1), magnetic flux $\Phi_B$ is a maximum value and therefore any change magnetic flux $\Phi_B$ can result in a maximum EMF ($\epsilon$) or voltage induced in closed loop 102. It is this induced voltage that can be used to characterize coupling coefficient $\kappa$ between any two individual conductive loops. It should be noted that, as orientation angle $\theta$ varies from 0 and approaches ninety degrees (or $\pi/2$ radians), magnetic flux $\Phi_B$ goes from maximum magnetic flux $\Phi_{Bmax}$ to zero as illustrated in FIG. 1C. Therefore, using Eq. (1) and Eq. (2), as shown in FIG. 2, the induced voltage, or EMF, is also related to the orientation angle $\theta$ in much the same way as magnetic flux $\Phi_B$. In this way, the magnetic coupling coefficient $\kappa$ between resonators will determine to a substantial degree the overall performance of a wireless power unit with respect to spatial orientation.

FIG. 3A shows wireless power unit 300 having first resonator 302 and second resonator 304 having a magnetic coupling coefficient $\kappa$ with a value of about 1.0 (indicating a strong coupling configuration) and a spatial orientation angle $\theta$ with respect to NFMR magnetic field $B_{NFMR}$. In this configuration, the effect of magnetic coupling between the two resonators is strong enough that a voltage generated at one resonator can effectively cancel out a voltage generated at the other resonator. In this example, and for sake of simplicity, resonators 302 and 304 can each be cylindrical in shape having characteristic length L with N loops of conductive wire 306 that terminates at one end at a common potential (system GND) and another end at terminal nodes 308 and 310 providing voltages V1 and V2, respectively. Wireless power unit 300 can provide output voltage $V_{out}$ as a difference of voltages V1 and V2. In this arrangement, output voltage $V_{out}$ is dependent upon the spatial orientation of wireless power unit 300 with respect to NFMR magnetic field $B_{NFMR}$ as well as the intrinsic coupling between first resonator 302 and second resonator 304 (characterized by magnetic coupling coefficient $\kappa=1.0$). More specifically, any magnetic field generated by first resonator 302 that magnetically couples with second resonator 304 results in a voltage induced in second resonator 304 that is about equal in magnitude and opposite in polarity to that induced in first resonator 302.

More specifically, first resonator 302 can resonate with magnetic field $B_{NFMR}$ to create magnetic field $B_1$. Since magnetic coupling coefficient $\kappa \approx 1.0$ any magnetic field generated by first resonator 302 will magnetically couple with second resonator 304 (and vice versa). For example, as shown in FIG. 3B, magnetic field $B_1$ will interact with second resonator 304 to induce voltage V2 at node 310 that is 180° out of phase with and equal in magnitude with voltage V1 at node 308 (in other words, V1=−V2) which as shown in FIG. 3B results in a null value for output voltage $V_{out}$ which is clearly unacceptable.

Figure 4A:
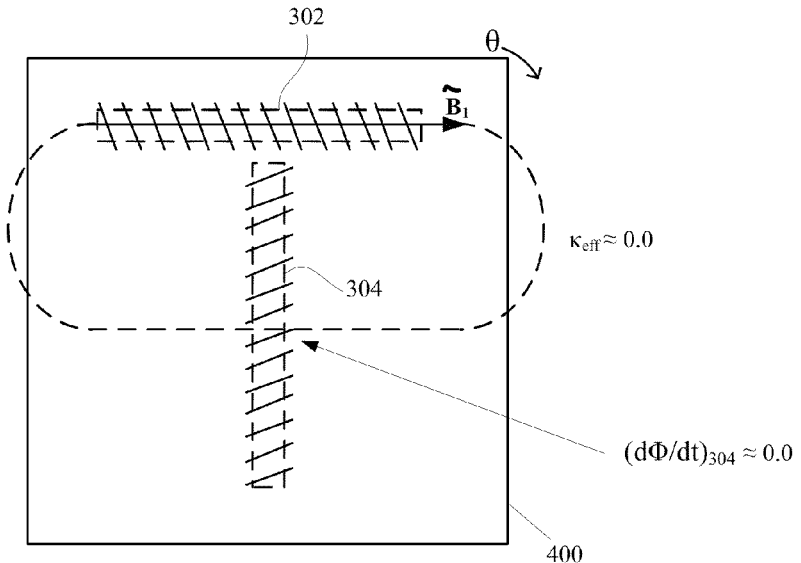
FIGS. 4A-4B and 5A-5F show an orientation independent power supply unit with various arrangements of resonance receivers in accordance with the described embodiments.

Therefore, by changing the orientation and position of first resonator 302 and second resonator 304 with respect to each other, the magnetic coupling between the resonators can be substantially reduced. In other words, properly orienting and positioning first resonator 302 and second resonator 304 can result in effectively magnetically de-coupling of first resonator 302 and second resonator 304 in which case an effective magnetic coupling coefficient $\kappa_{eff}$ can approach zero. For example, FIG. 4A shows wireless power supply 400 in accordance the described embodiments characterized as having an effective magnetic coupling coefficient $\kappa_{eff} \approx 0$ by which it is meant that the net effect of any magnetic coupling between first resonator 302 and second resonator 304 effectively cancel each other out thereby simulating a situation of no magnetic coupling. More specifically, when first resonator 302 resonates with magnetic field $B_{NFMR}$, induced magnetic field $B_1$ will be generated by first resonator 302. However, unlike the situation where first resonator 302 and second resonator 304 are strongly coupled, magnetic field lines from magnetic field $B_1$ intersect second resonator 304 at about 90°. In this way and in accordance with Eq. (2), the magnetic flux Φ and therefore any EMF generated in second resonator 304 is about zero.

Figure 4B:
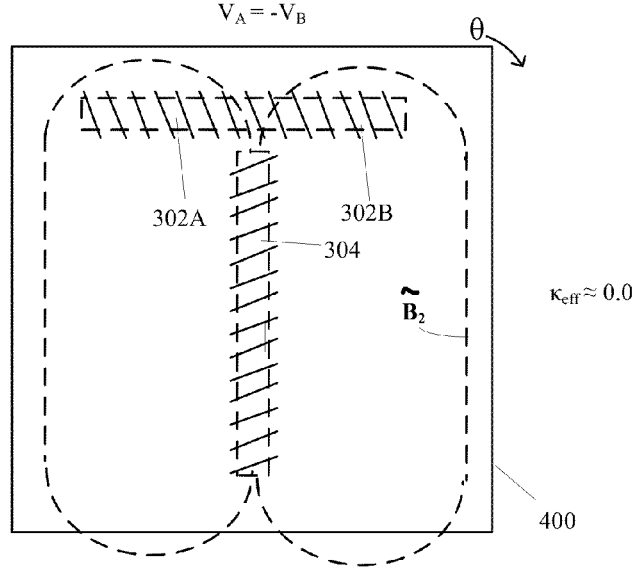

FIG. 4B shows another situation where second resonator 304 resonates with magnetic field $B_{NFMR}$ creating induced magnetic field $B_2$. In this situation, induced magnetic field $B_2$ interacts with first portion 302-1 of resonator 302 to induce voltage $V_A$. Concurrently, induced magnetic field $B_2$ interacts with second portion 302-2 of resonator 302 to induce voltage $V_B$ that in accordance with Lenz's Law (also known as the right hand rule) is equal in magnitude but opposite in polarity to $V_A$. In this way, any voltages $V_A$ and $V_B$ induced in first resonator 302 effectively cancel each other out resulting in no net induced voltage in first resonator 302 simulating an effective magnetic coupling coefficient $\kappa_{eff}$ of about zero for all orientation angles θ.

Figure 5A:
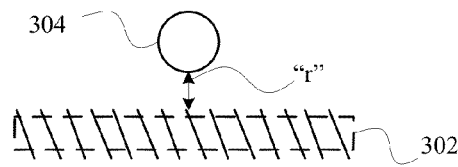
Figure 5A:
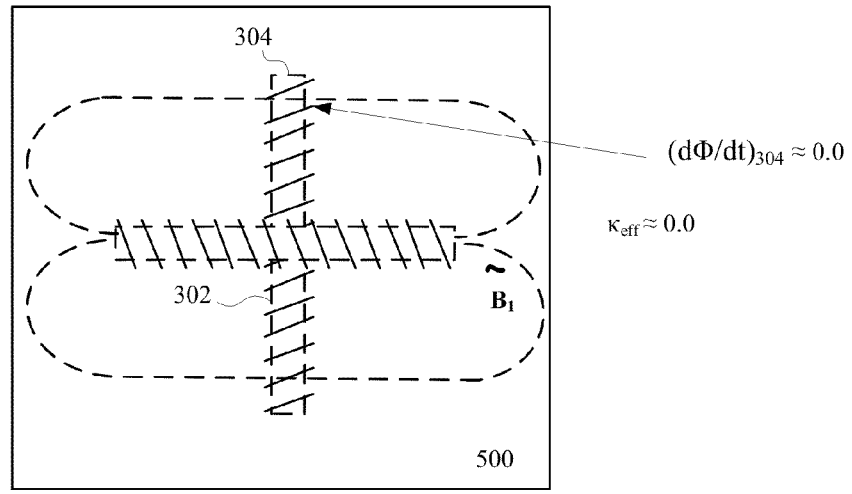
Figure 5B:
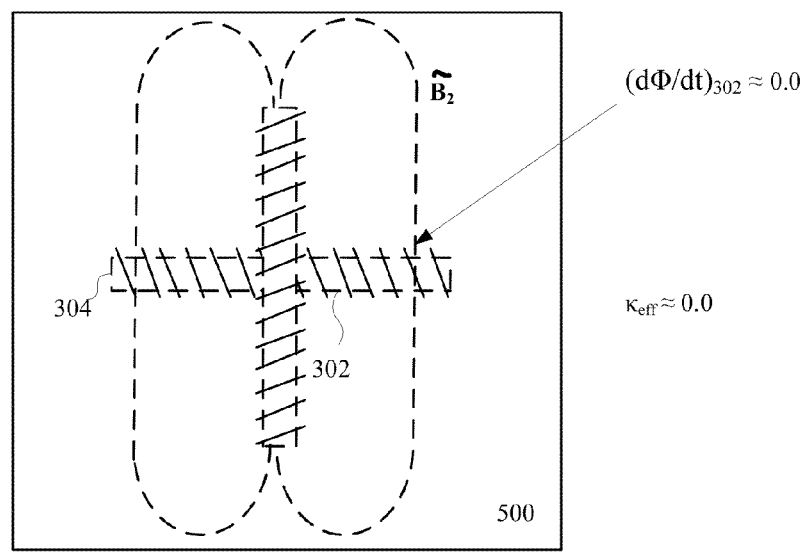
Figure 5C:
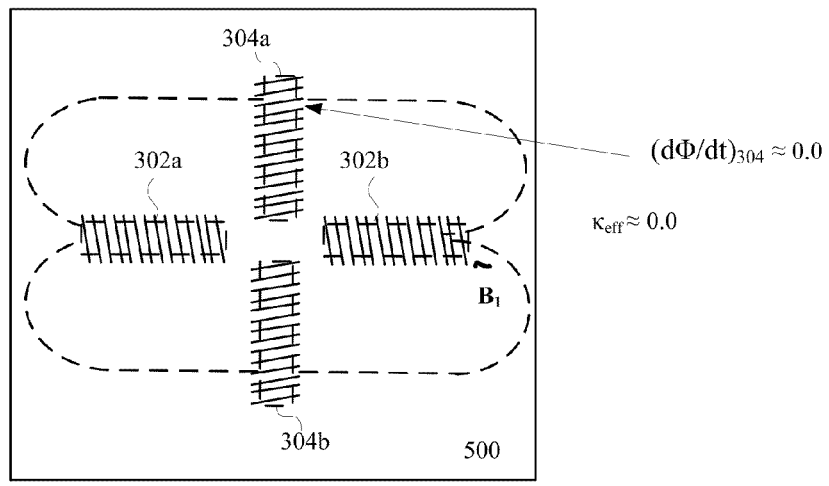
Figure 5D:
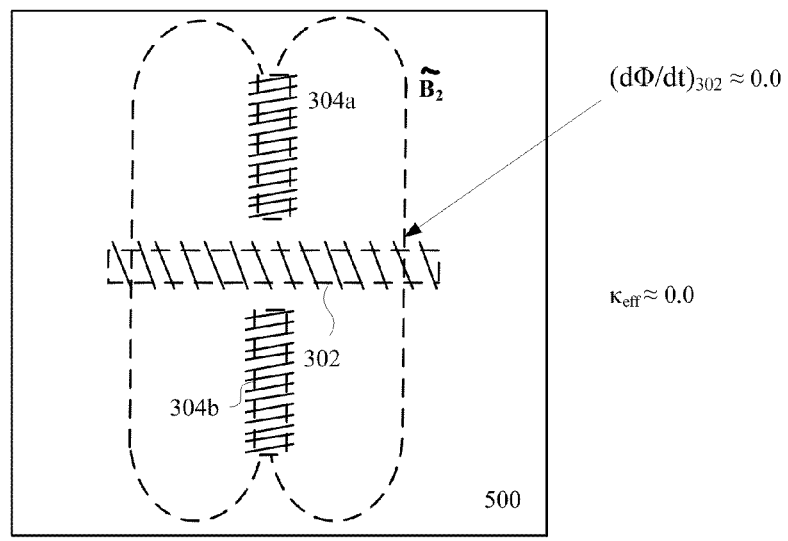
Figure 5E:
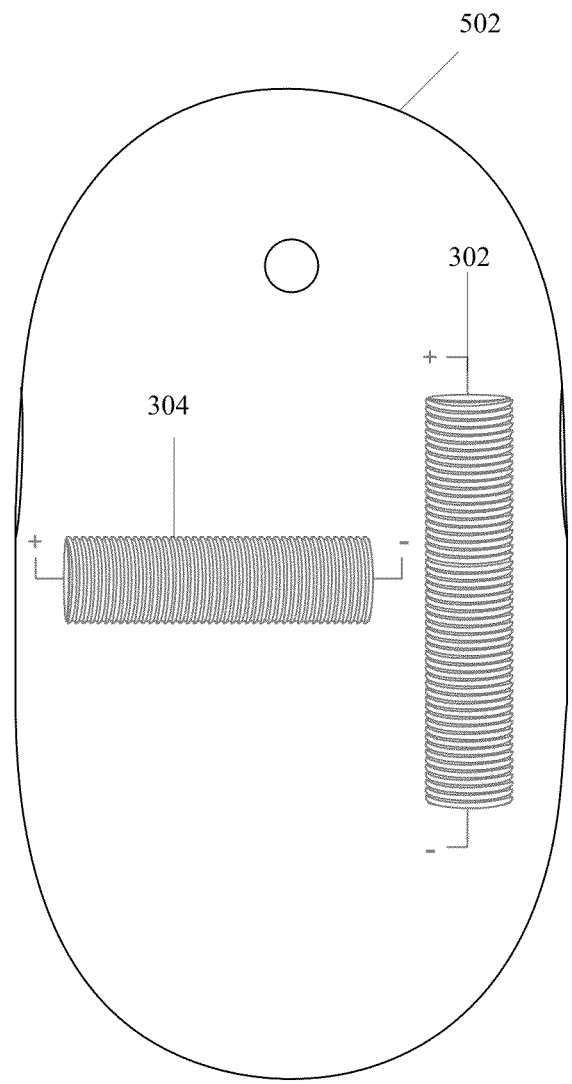
Figure 5F:
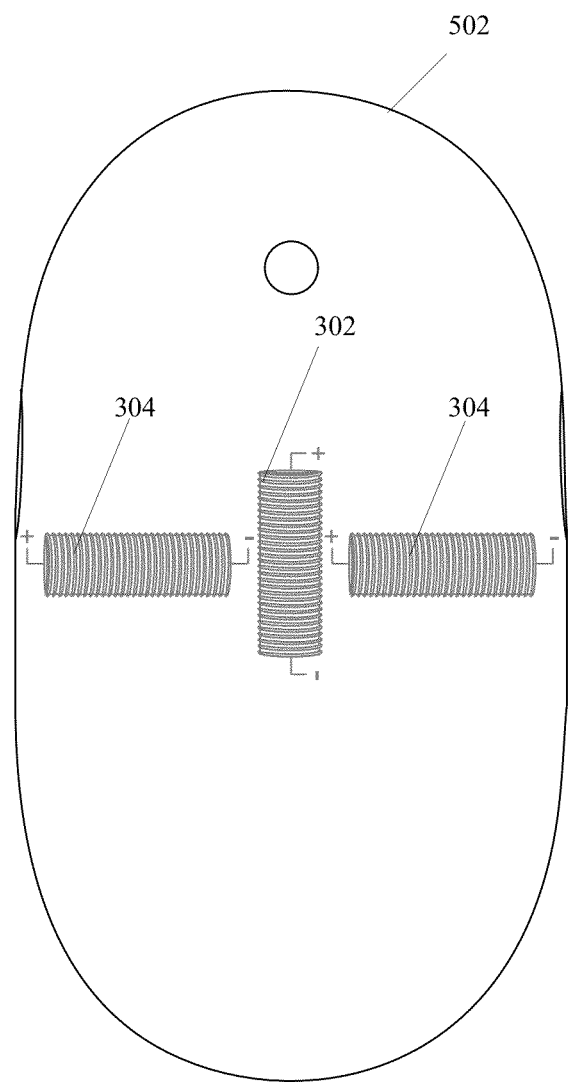

FIG. 5A shows another embodiment of orientation independent wireless power supply 400 in the form of wireless power supply 500 in which first resonator 302 and second resonator 304 are placed perpendicular in a cross like arrangement. In this arrangement, the midpoints of both first resonator 302 and second resonator 304 are coincident with each other and displaced in the Z direction distance "r". In this way, magnetic field lines of a magnetic field generated by first resonator 302 intersect second resonator 304 at ninety degrees resulting in magnetic $\Phi_{304}$ for second resonator 304 being about zero. As with the situation described above with respect to FIG. 4A, the net EMF generated is zero resulting in an effective magnetic coupling coefficient $\kappa_{eff}=0$. FIG. 5B shows an equivalent situation for second resonator 304 with respect to first resonator 302. In this way, the symmetric nature of the magnetic field $B_2$ generated by second resonator with respect to first resonator 302 results in an effective coupling coefficient coupling $\kappa_{eff} \approx 0$. FIG. 5C shows additional arrangements of first resonator 302 and second resonator 304 that are divided in substantially equal portions 302a, 302b and 304a, 304b respectively that maintains an effective magnetic coupling coefficient $\kappa_{eff} \approx 0$. FIG. 5D shows additional arrangements of first resonator 302 and second resonator 304 where either one or the other of resonator 302 or 304 are divided in substantially equal portions. For example, as shown second resonator 304 can be divided into substantially equal portions 304a, 304b respectively and arranged in such a way with respect to first resonator 302 that maintains an effective magnetic coupling coefficient $\kappa_{eff} \approx 0$. FIG. 5E and FIG. 5F show representative peripheral devices in the form of computer mouse 500 having various configurations of first resonator 302 and second resonator 304 in accordance with the described embodiments.

Figure 6A:
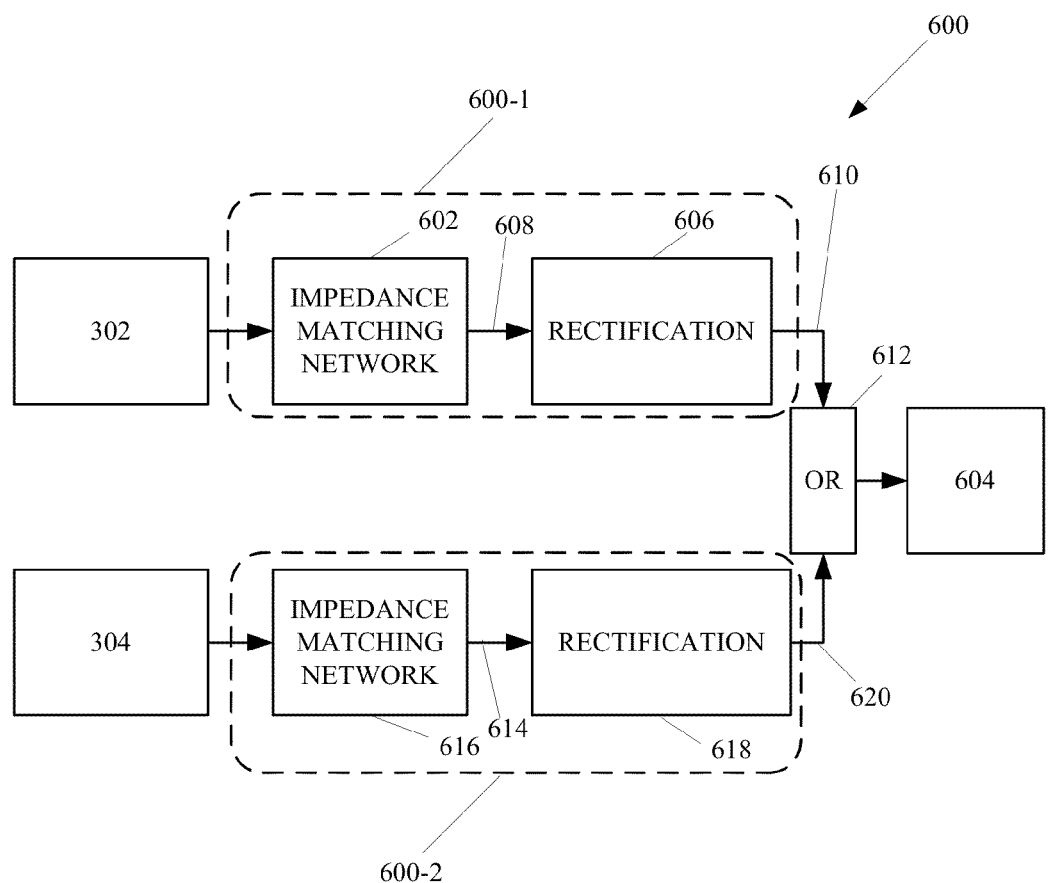
FIGS. 6A-6C show various embodiments of a functional block diagram of a combining circuit suitable for combining power between multiple resonant receivers in accordance with a described embodiment.

However, for magnetic resonance power units having more than one resonant receiver, assuring that the magnetic coupling coefficient $\kappa_{eff} \approx 0$ for the receivers is only the first step to be able to combine their power additively. In particular, the resonating circuit attached to each receiver is required to be isolated from the resonating circuit of another receiver as well as provide load sharing duties for a load device. FIG. 6A is a functional block diagram of a particular embodiment of combining circuit 600 that can be used to transfer power from a plurality of resonant receivers in accordance with the described embodiments. More specifically, each receiver 302 and 304 can be coupled independently to corresponding branches of combining circuit 600. For example, receiver 302 can be coupled to first branch 600-1 that can include at least impedance matching network 602 arranged to match impedances between device 604 and receiver 302. Rectification circuit 606 can be used to convert varying signals (such as AC signal 608) from receiver 302 to DC signal 610 that can then be provided as input to OR circuit 612. Likewise, receiver 304 can be electrically coupled to branch 600-2 that can include impedance matching network 616, rectification circuit 618 that outputs DC signal 620 that can in turn be provided as input to OR circuit 612. In the described embodiment, OR circuit 612 can act as a load balance in order that power P is provided to device 604 in a relatively continuous manner. In other words, if receiver 302 is receiving more power from magnetic field $B_{NFRM}$ than is receiver 304, then OR circuit 612 will allow receiver 302 to provide more power to device 604 than receiver 304, and vice versa.

Figure 6B:
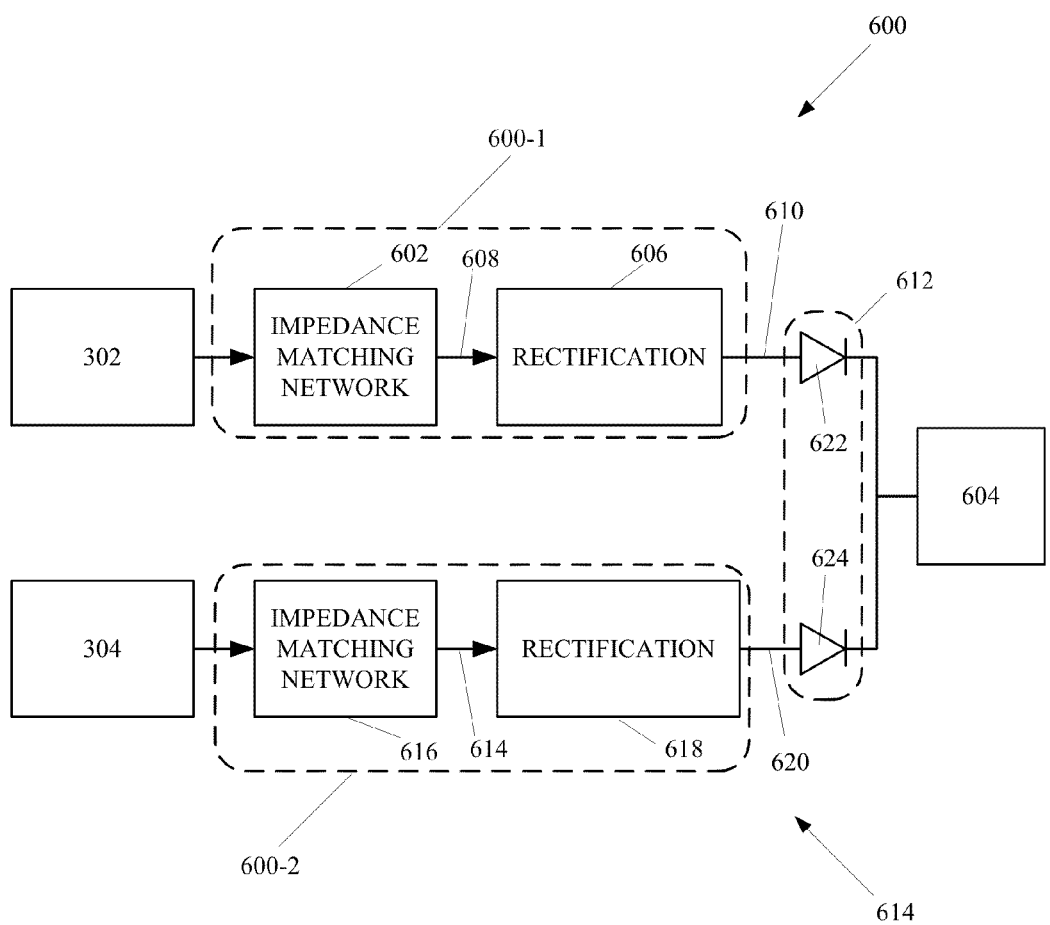
Figure 6C:
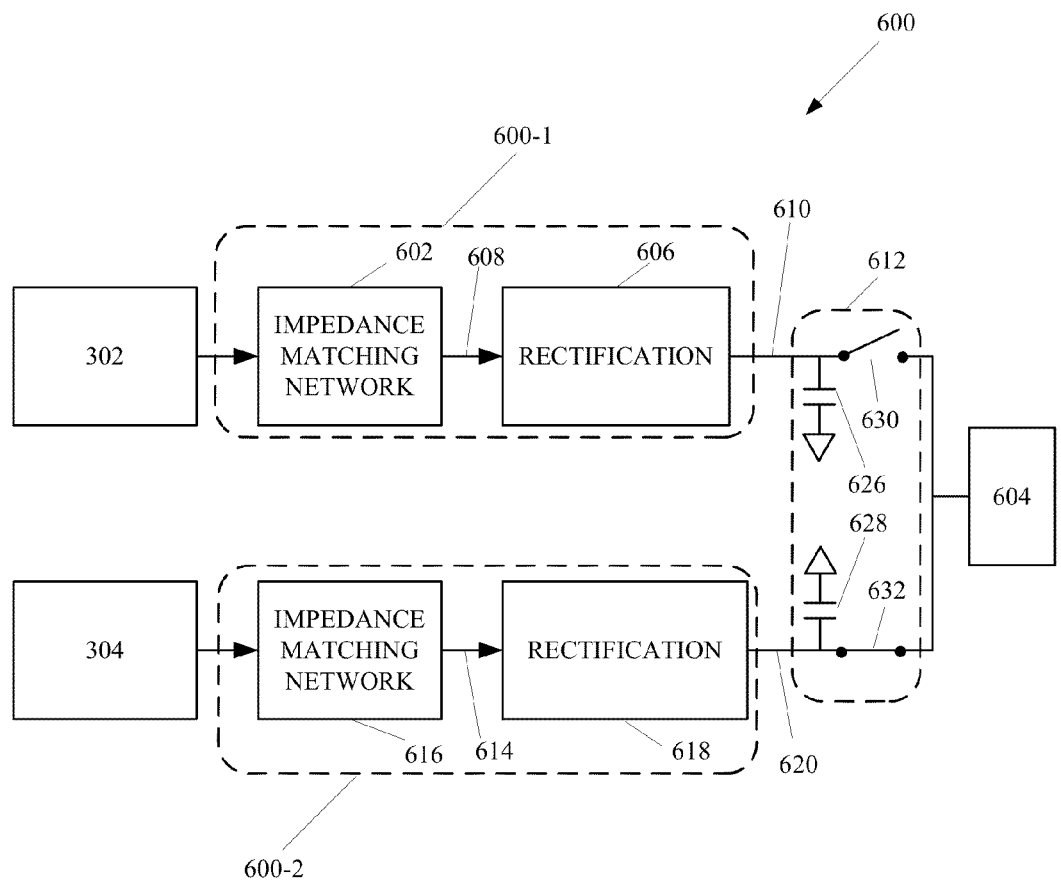

FIG. 6B shows a specific implementation of OR circuit 612 formed of diodes 622 and 624. FIG. 6C on the other hand shows yet another implementation of OR circuit 612 that includes energy storage elements 626 and 628 arranged to temporarily store energy received from branches 600-1 and 600-2 in the form of rectified DC voltage 608 and 620, respectively. In one embodiment, energy storage elements 626 and 628 can take the form of capacitors 626 and 628. Load balancing switches 630 and 632 can be used to assure proper load balancing between resonators 302 and 304 providing consistent power to device 604.

Figure 7:
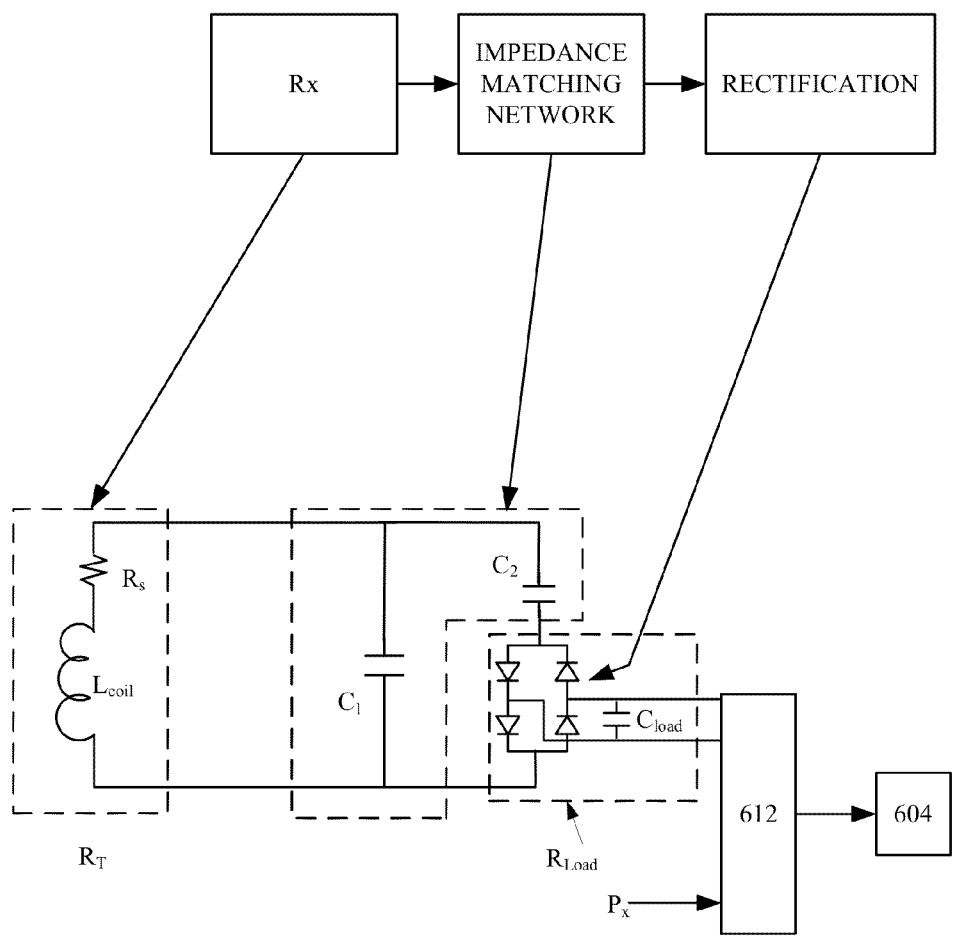
FIG. 7 shows a particular implementation of the power sharing circuit shown in FIG. 6A.

FIG. 7 shows a model 700 of resonant receivers 302 and 304 power sharing circuit 600. More specifically, each of receivers 302 and 304 can be modeled as inductor L702 and series resister R704. Impedance matching network can be modeled as capacitances C1 and C2 arranged to match receiver load $R_R$ with device load $R_L$. Full bridge rectifier 706 can be used to convert AC signals from transmitters 302 and 304 to DC signals for use by device 606.

Figure 8:
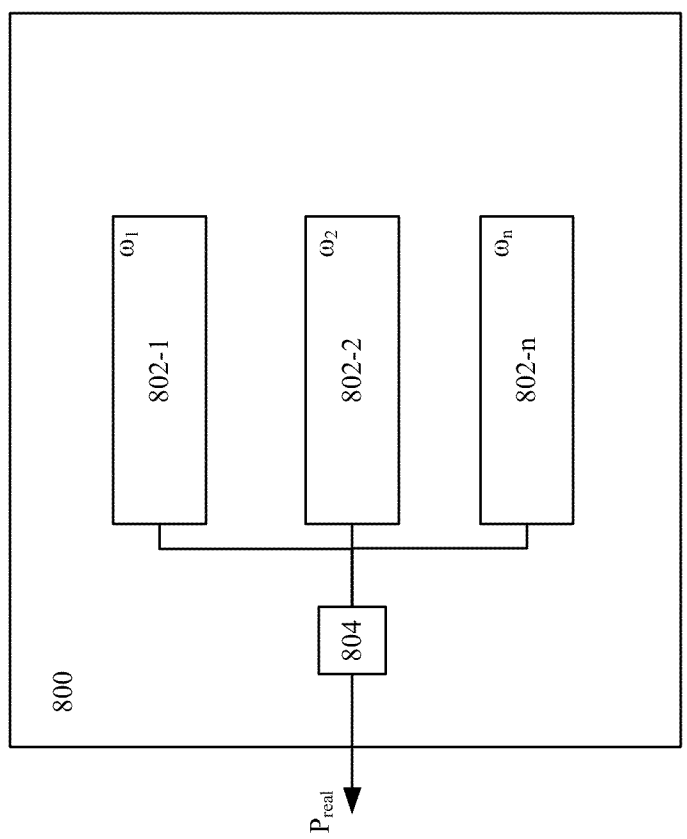
FIG. 8 shows multiple frequency resonance power unit having multiple independent resonance receivers in accordance with a described embodiment

FIG. 8 shows multiple frequency resonance power unit 800 having multiple independent resonance receivers 802-1, 802-2 ... 802-n in accordance with a described embodiment. In the described embodiment, independent resonance receivers 802-1, 802-2 ... 802-n can each be configured to operate most effectively at different frequency bands. This arrangement can be useful in those situations where, for example, different countries may restrict the use of certain frequency bands due to local regulations leaving a limited number of frequency bands for use to wirelessly provide power. Accordingly, multiple receiver power unit 800 can be configured to include multiple receiving resonators each configured to receive power from a NFMR magnetic field most effectively at a specific frequency band. For example, resonance receiver 802-1 can be configured to receive power most effectively from a NFMR magnetic field in which it is immersed at frequency $\omega_1$. On the other hand, resonance receiver 802-2 can be configured to receive power most effectively from the NFMR magnetic field in which it is immersed at frequency $\omega_2$. In any case, power combiner unit 804 can be used to combine power of the receivers in those situations where useable power is being received at frequency $\omega_1$ and frequency $\omega_2$.

However, in situations where power is received from the NFMR magnetic field at either frequency $\omega_1$ or frequency $\omega_2$, combiner unit 804 can be used to select whichever resonance receiver (either resonance receiver 802-1 or resonance receiver 802-2) is operating or at least receiving an amount of power greater than a threshold value. In this situation, combiner unit 804 can sense an amount of power being received at resonance receivers 802-1 and 802-2 and based upon the comparison, combiner unit 804 can select the appropriate resonance power receiver to provide power to a circuit. In one embodiment, the resonance receiver deemed to be most effective in its interaction with the NFMR magnetic field (based upon an amount of real power received, for example) can be selected. The effectiveness of the interaction with the NFMR magnetic field can be based upon an amount of induced magnetic flux in one or the other resonance receivers. It should be noted that the sensing and selecting can be ongoing and performed in real time. In this way, the multiple resonance receivers can be placed in close physical proximity to each other resulting in an effective magnetic coupling coefficient $\kappa_{eff} > 0$.

Figure 9:
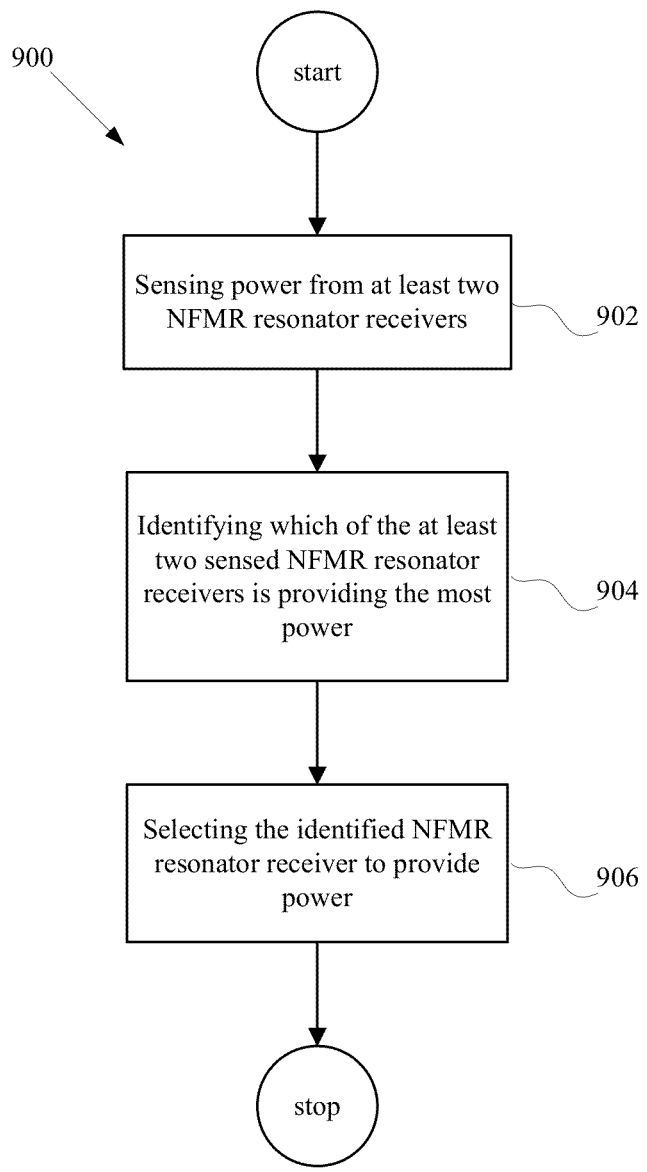
FIG. 9 shows a flowchart detailing a method performed by a combiner unit of FIG. 8 in accordance with the described embodiments.

FIG. 9 shows a flow chart detailing process 900 carried out by combiner unit 804 in accordance with an embodiment of the invention. Process 900 can begin at 902 by the combiner unit sensing power received from at least two resonant power receivers each of which is arranged to receive power from an NFMR magnetic field at specified resonant frequencies that are different from each other. At 904, the combiner unit identifies which of the sensed resonant power receivers is providing the most power. At 906, the combiner unit provides power from the identified resonant power receivers.

Figure 10:
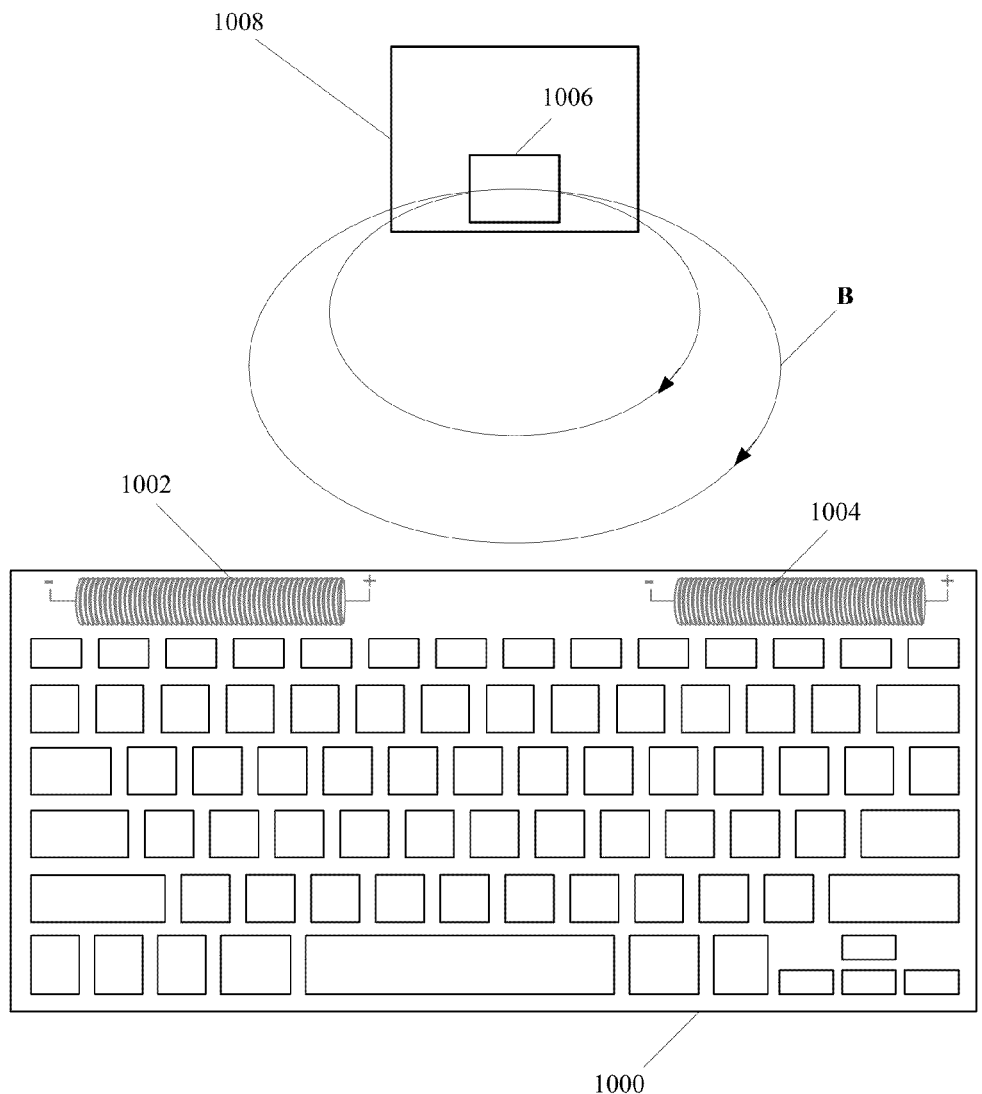
FIGS. 10 and 11 shows representative peripheral devices having small form factor wireless power unit for providing power received from a magnetic field.
Figure 11:
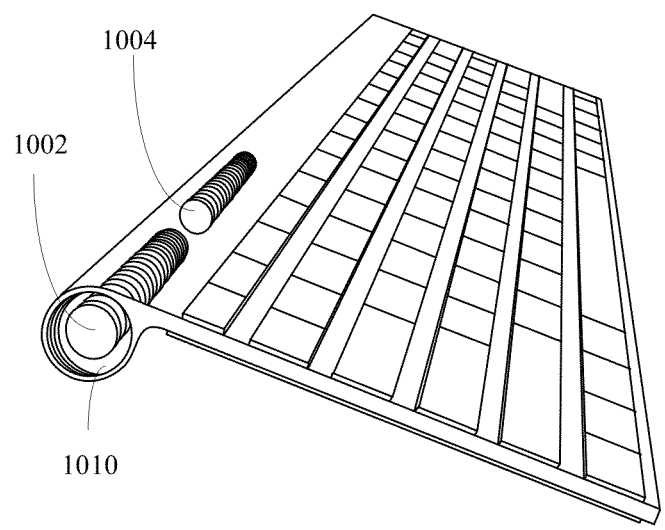

FIG. 10 shows a representative peripheral device in the form of computer keyboard 1000 in accordance with the described embodiments. Computer mouse 1000 can include at least first small form factor wireless power unit 1002 and second small form wireless power unit 1004 each of which can wirelessly receive power from magnetic field B. In the described embodiment, magnetic field B can be provided by magnetic transmitter unit 1006 incorporated into, for example, computing device 1008, such as a desktop computer. During most foreseeable operational scenarios, keyboard 1000 will be positioned with respect to desktop computer 1008 in front facing arrangement. In this way, there is no need to magnetically de-couple small form factor wireless power unit 1002 and 1004 and as such both can provide power at the same time that can be used to operate keyboard 1000. Since small form factor wireless power units 1002 and 1004 can be sized along the lines of a standard AAA battery, small form factor wireless power units 1002 and 1004 (or just one if need be) can be accommodated into battery compartment 1010 of keyboard 1000 as shown in FIG. 11. In this way, small form factor wireless power supply 1002 and 1004 can be used to systematically replace conventional batteries along the lines of standard AAA batteries. It should be noted however, that since small form factor wireless power units 1002 and 1004 can be of any size and shape, it is contemplated that any battery of any size or configuration can be replaced by small form factor power units 1002 and 1004.

Figure 12:
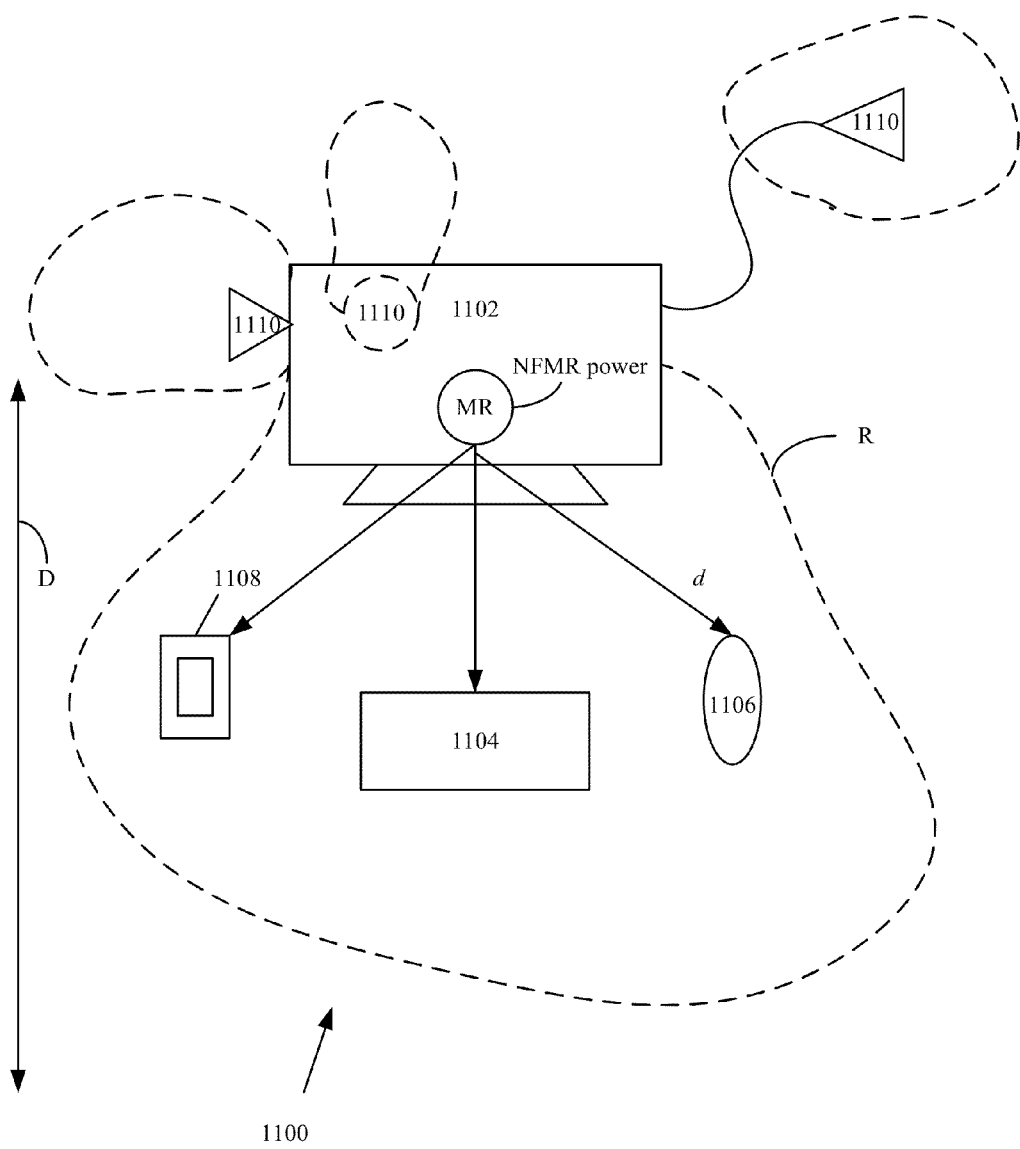
FIG. 12 shows a distributed system in accordance with the described embodiments.

FIG. 12 shows representative virtual charging area 1100 in accordance with the described embodiments. Virtual charging area 1100 provides region R of charging for suitably configured devices placed within the region R. NFMR power supply can be placed in central unit such as desktop computer. In this way, the desktop computer can provide the NFMR power supply with computing resources. It should be noted that the near field magnetic resonance (NFMR) power supply can include high Q circuit that relies upon near field magnetic coupling by way of a resonance channel formed between resonances of the power source and sink to transfer power. The NFMR power supply can be a standalone unit such as, for example, included in a desk top computer, laptop computer, tablet computer, and so on. In other embodiments, the NFMR power supply can take the form of a portable type unit such as a dongle that can be connected to a legacy device such as a desktop computer thereby providing the ability to retrofit devices. In still other embodiments, housing or a portion of a housing used to enclose the NFMR power source can act to extend a useful range of the NFMR power supply.

As shown in FIG. 12 virtual charging area 1100 includes central unit 1102 (desktop computer) that can include the NFMR power supply, keyboard 1104, mouse 1106, and portable media player 1108. In one embodiment, keyboard 1104 can be configured to receive power directly from the NFMR power supply included in desktop computer 1102 as can mouse 1106 and portable media player 1108 (when located within range R).

In some cases, the ability of desktop computer 1102 to provide power directly to mouse 1108, for example, can be reduced due to any number of factors. Such factors can include, for example, the addition of other devices into region R that require power from the NFMR power supply, obstacles interfering with the direct power channel formed between the NFMR and mouse 1106, and so on. In this case, keyboard 1104 can act as a re-resonator such that a portion of the power delivered to keyboard 1104 from the NFMR power supply can be passed on by way of a re-resonator transmission unit (not shown) in keyboard 1104. In this way, any power loss experienced by mouse 1106 can be ameliorated by the power received from keyboard 1104. This arrangement can be transitory or can last for as long as mouse 1106 is not able to receive adequate power directly from the NFMR power supply. In other cases, the locating of portable media player 1108 within region R can reduce the amount of power available to keyboard 1104 and mouse 1106. In this case, if a battery in keyboard 1106 is fully charged (or additional charge is not necessary) then keyboard 1106 can decouple a charging circuit while still maintaining a re-resonator circuit providing power to mouse 1106.

In some embodiments, dongle 1110 can be connected to desktop computer 1102 (by way of a USB port or cable, for example). So connected, dongle 1110 can, in turn, act as a range extender for the NFMR power supply. In this way, dongle 1110 can extend a range that power can be provided by the NFMR power supply included in desktop computer 1102. In some cases, dongle 1110 can re-resonate power already received from the NFMR power supply while in other cases, dongle 1110 can include its own NFMR power supply. By having its own NFMR power supply, dongle 1110 can provide additional power wirelessly to those devices within virtual charging region 1100 separate from the power provided by the NFMR power supply included in desktop 1102. It should be noted that in some embodiments, the housing of desktop computer 1102 (or a portion thereof) can be used as a resonator as part of the NFMR power supply.

Figure 13:
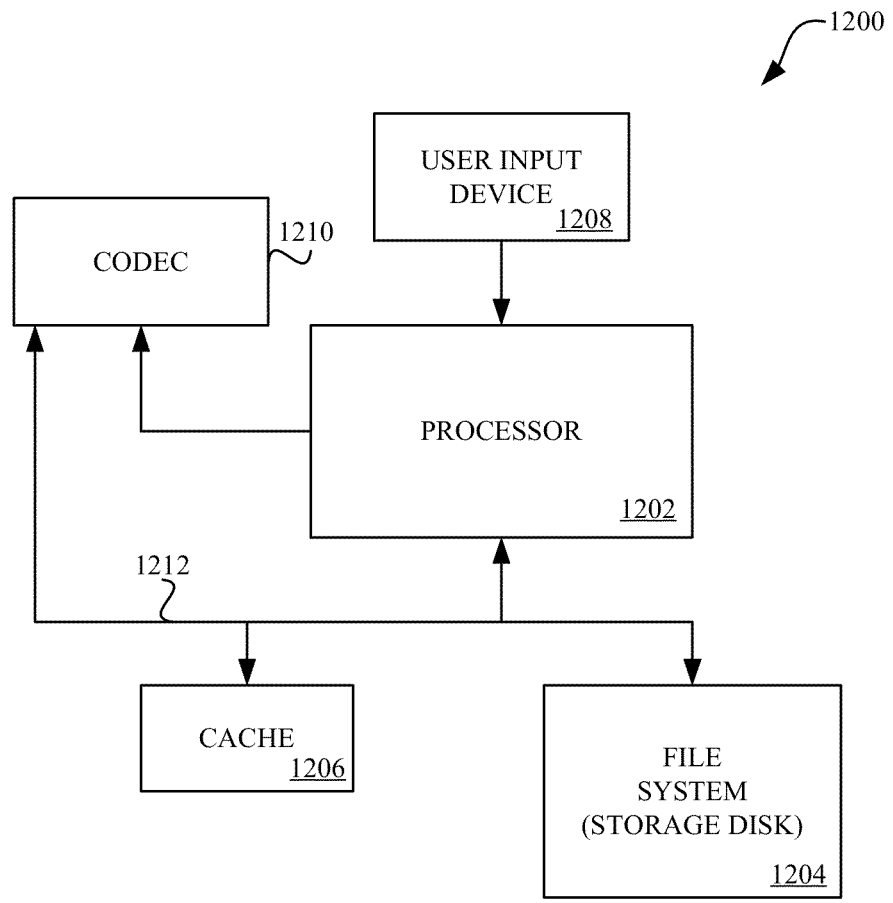
FIG. 13 shows a computing system in accordance with the described embodiments.

FIG. 13 is a block diagram of computing system 1200 in accordance with the described embodiments. Computing system 1200 includes processor 1202 that pertains to a microprocessor or controller for controlling the overall operation of computing system 1200. Computing system 1200 stores data pertaining to media items, for example, in a file system 1204 and a cache 1206. The file system 1204 is, typically, a storage disk or a plurality of disks. The file system typically provides high capacity storage capability for computing system 1200. However, since the access time to the file system 1204 is relatively slow, computing system 1200 also includes a cache 1206. The cache 1206 is, for example, Random-Access Memory (RAM) provided by semiconductor memory. The relative access time to the cache 1206 is substantially shorter than for the file system 1204. However, the cache 1206 does not have the large storage capacity of the file system 1204. Further, the file system 1204, when active, consumes more power than does the cache 1206. The power consumption is particularly important when the computing system 1200 is a portable media player that is powered by a battery (not shown).

Computing system 1200 also includes a user input device 1208 that allows a user of computing system 1200 to interact with computing system 1200. For example, the user input device 1208 can take a variety of forms, such as a button, keypad, dial, etc. Still further, the computing system 1200 includes data bus 1210 can facilitate data transfer between at least the file system 1204, the cache 1206, the processor 1202, and the CODEC 1212.

In one embodiment, computing system 1200 serves to store a plurality of media items (e.g., songs) in the file system 1204. When a user desires to have the media player play a particular media item, a list of available media items is displayed on the display 1210. Then, using the user input device 1208, a user can select one of the available media items. The processor 1202, upon receiving a selection of a particular media item, supplies the media data (e.g., audio file) for the particular media item to a coder/decoder (CODEC) 1212. The CODEC 1212 then produces audio output signals for audio jack 1214 to output to an external circuit. For example, headphones or earphones that connect to computing system 1200 would be considered an example of the external circuit. In another embodiment, a computer-readable medium is provided that includes computer program instructions.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the invention. Thus, the foregoing descriptions of specific embodiments are presented for purposes of illustration and description. They are not intended to be exhaustive or to limit the invention to the precise forms disclosed. It will be apparent to one of ordinary skill in the art that many modifications and variations are possible in view of the above teachings.

What is claimed is:

1. A wireless power unit arranged to provide at least a minimum amount of power to a device wirelessly received from a magnetic field provided by a near field magnetic resonance (NFMR) transmitter unit having a resonance frequency $\omega_T$, the minimum amount of power delivered to the device being independent of a spatial orientation of the portable power unit with respect to the magnetic field, comprising:
   a first resonator structure, the first resonator structure having a resonant frequency $\omega_1$, and a characteristic size $L_1$;
   a second resonator structure, the second resonator structure having a resonant frequency $\omega_2$, and a characteristic size $L_2$, wherein the first and second resonator structures are magnetically decoupled such that an effective magnetic coupling coefficient κeff between the first and second resonator structures is about zero; and
   a power combining circuit coupled to the magnetically decoupled first and second resonator structures arranged to:
   load match the first and second resonator structures and the device,
   load balance power from the first and second resonator structures, and
   maintain an effective magnetic coupling coefficient between the first and second resonator structures at about zero regardless of a spatial orientation of the wireless power unit with regards to the NFMR magnetic field such that the device wirelessly receives the at least the minimum amount of power from the wireless power unit regardless of an orientation of the at least two NFMR power receivers with respect to the NFMR magnetic field.

2. The wireless power unit as recited in claim 1, wherein the first resonator structure and the second resonator structure are fixed at positions relative to each other within the wireless power unit such that the effective magnetic coupling coefficient κeff between the first and second resonator structures is about zero regardless of the spatial orientation of the portable power unit with respect to the magnetic field provided by the wireless transmitter unit.

3. The wireless power unit as recited in claim 1, wherein a non-radiative power transfer between wireless transmitter unit and the first resonator structure and the second resonator structures is mediated through a magnetic resonant coupling between the first resonator structure and the second resonator structure when at least one of the first resonator structure and the second resonator structure is in a tuned state with respect to the NFMR transmitter unit.

4. The wireless power unit as recited in claim 3, wherein the first resonator structure is in the tuned state when the first resonant frequency $\omega_1$ and the wireless transmitter resonance frequency $\omega_T$ are separated by a bandwidth of no more than 3 db.

5. The wireless power unit as recited in claim 4, wherein the second resonator structure is in the tuned state when the second resonant frequency $\omega_2$ and the wireless transmitter resonance frequency $\omega_T$ are separated by a bandwidth of no more than 3 db.

6. The wireless power unit as recited in claim 5, wherein the first resonator structure comprises:
   a first resonating coil, the first resonating coil comprising:
   a first central core region, and
   a first plurality of loops of continuous conductive material circumferentially wrapped around the cylindrical central core region.

7. The wireless power unit as recited in claim 6, wherein the second resonator structure comprises:
   a second resonating coil, the second resonating coil comprising:
   a second central core region; and
   a second plurality of loops of continuous conductive material circumferentially wrapped around the cylindrical central core region, wherein a first EMF induced in the first resonating coil does not induce an overall EMF in the second resonating coil.

8. The wireless power unit as recited in claim 6, wherein a length of the first resonating coil is in accordance with the characteristic size $L_1$.

9. The wireless power unit as recited in claim 6, wherein a length of the second resonating coil is in accordance with the characteristic size $L_2$.

10. The wireless power unit as recited in claim 9, a longitudinal axis of the first resonating coil is perpendicular to a longitudinal axis of the second resonating coil.

11. The wireless power unit as recited in claim 10, wherein in a first arrangement, a first end of the first resonating coil is proximate to and co-planar with a mid-point of the longitudinal axis of the second resonating coil.

12. The wireless power unit as recited in claim 1, wherein the power combining unit comprises:
an impedance matching network connected to the first and second resonator structures arranged to match a receiver impedance with a load impedance;
a rectifying circuit arranged to receive an AC signal from the impedance matching network and covert the AC signal to a DC signal; and
an OR circuit arranged to provide a load balancing function between the first and second resonator structures and the device.

13. The wireless power unit as recited in claim 12, wherein the first and second resonator structures are each modeled as an inductor having an inductance value $L_1$ and a series resistor $R_s$.

14. The wireless power unit as recited in claim 13, wherein impedance matching circuit comprises:
a capacitive network comprising:
a first capacitor having a first capacitance value C1; and
a second capacitor having a second capacitance value C2 connected in parallel with the first capacitor, wherein when the first and second resonator structures are tuned with an NFMR transmitter, the receiver inductors resonate with the capacitive network to match the load resistance of the device and the load resistance of the receivers.

15. The wireless power unit as recited in claim 14, wherein the rectifying circuit comprises a full bridge rectifier circuit further comprising a plurality of diodes.

16. The wireless power unit as recited in claim 15, wherein the OR circuit comprises at least one diode.

17. The wireless power unit as recited in claim 16, wherein the first and the second of the first and second resonator structures are electrically connected to each other by way of the OR circuit.

18. The wireless power unit as recited in claim 17, wherein the OR circuit comprises:
a storage element; and
a load balancing switch circuit having a first node connected to the storage element and a second node connected to the device, wherein a first node of the storage element is connected to an output node of the rectifying circuit and the first node of the switch circuit and a second node of the storage element is connected to ground, wherein the load balancing switch circuit are used to assure proper load balancing between first and second resonator structures thereby providing consistent power to the device.

19. A peripheral device arranged to wirelessly receive power from a NFMR power transmitter independent of the orientation of the peripheral device with respect to the NFMR power transmitter, comprising:
a wireless power receiving unit comprising:
at least two magnetically de-coupled near field magnetic resonance (NFMR) power receivers each arranged to receive power from a NFMR magnetic field;
a power combining circuit coupled to the at least two magnetically decoupled NFMR power receivers arranged to:
load match the at least two NFMR power receivers and the device,
load balance power from the at least two NFMR power receivers, and
maintain an effective magnetic coupling coefficient between the at least two magnetically de-coupled NFMR power receivers at about zero regardless of a spatial orientation of the wireless power unit with regards to the NFMR magnetic field such that the device wirelessly receives the substantial constant power from the wireless power unit regardless of an orientation of the at least two NFMR power receivers with respect to the NFMR magnetic field.

20. The peripheral device as recited in claim 19, wherein the power combining unit comprises:
an impedance matching network connected to the at least two NFMR power receivers arranged to match a receiver impedance with a load impedance;
a rectifying circuit arranged to receive an AC signal from the impedance matching network and covert the AC signal to a DC signal; and
an OR circuit arranged to provide a load balancing function between the at least two magnetically de-coupled NFMR power receivers and the device.

21. The peripheral device as recited in claim 20, wherein the at least two NFMR power receivers are each modeled as an inductor having an inductance value $L_1$ and a series resistor $R_s$.

22. The peripheral device as recited in claim 21, wherein impedance matching circuit comprises:
a capacitive network comprising:
a first capacitor having a first capacitance value C1; and
a second capacitor having a second capacitance value C2 connected in parallel with the first capacitor, wherein when the at least two NFMR receivers are in resonance mode with an NFMR transmitter, the receiver inductors resonate with the capacitive network to match the load resistance of the device and the load resistance of the receivers.

23. The peripheral device as recited in claim 22, wherein the rectifying circuit comprises a full bridge rectifier circuit further comprising a plurality of diodes.

24. The peripheral device as recited in claim 23, wherein the OR circuit comprises at least one diode.

25. The peripheral device as recited in claim 24, wherein the peripheral device includes at least three NFMR power receivers that are arranged perpendicular to each other such that when the peripheral device is moved to within any position within a three dimensional spatial volume, there is no substantial loss in power wirelessly received from an NFMR power transmitter.

* * * * *